United States Patent [19]
Yamada

[11] Patent Number: 5,253,841
[45] Date of Patent: Oct. 19, 1993

[54] PRINTER VIBRATION ISOLATING APPARATUS

[75] Inventor: Tetsuya Yamada, Okayama, Japan

[73] Assignee: Sanwa Supply Co., Ltd., Okayama, Japan

[21] Appl. No.: 989,911

[22] Filed: Dec. 11, 1992

Related U.S. Application Data

[63] Continuation of Ser. No. 719,100, Jun. 21, 1991, abandoned, which is a continuation of Ser. No. 473,342, Feb. 1, 1990, abandoned.

[30] Foreign Application Priority Data

Jun. 21, 1989 [JP] Japan .................................. 1-160023

[51] Int. Cl.5 ............................................ F16M 11/00
[52] U.S. Cl. ................................. 248/638; 248/659
[58] Field of Search .............. 248/581, 638, 602, 596, 248/610, 657, 659, 918; 52/167 RM, 167 RS

[56] References Cited

U.S. PATENT DOCUMENTS

| | | | |
|---|---|---|---|
| 1,855,782 | 4/1932 | Ulrich | 248/581 X |
| 2,014,581 | 9/1935 | Norton | 248/581 |
| 2,572,969 | 10/1951 | Bacon et al. | 248/638 X |
| 3,782,674 | 1/1974 | Smith | 248/284 X |
| 4,974,378 | 12/1990 | Shustov | 248/638 X |

FOREIGN PATENT DOCUMENTS

| | | | |
|---|---|---|---|
| 1239990 | 7/1960 | France | 248/638 |
| 252724 | 10/1927 | Italy | 248/610 |
| 639666 | 5/1962 | Italy | 248/638 |

Primary Examiner—David A. Scherbel
Assistant Examiner—Derek J. Berger
Attorney, Agent, or Firm—Koda and Androlia

[57] ABSTRACT

An apparatus to isolate vibration during printing by a printer of a computer or a word processor, including vibration control swingable devices provided at their bearing portions, where the printer is mounted, with concave-surface bases extending in parallel to a direction of movement of a printing head of the printer and with rollers connected to the bearing portions which operate rolling motion on the concave-surface bases. The vibration control swingable devices may also include swing mounts for swinging the bearing portions in parallel to the direction of movement of the printing head. Thus, the vibration caused by the printer during printing can be isolated from other associated instruments.

1 Claim, 4 Drawing Sheets

PRINTER VIBRATION ISOLATING APPARATUS

This application is a continuation of application ser. No. 07/719,100, filed Jun. 21, 1991, now abandoned, which is a continuation of application Ser. No. 07/473,342, filed Feb. 1, 1990, now abandoned.

BACKGROUND OF THE INVENTION

1. Industrial Field of the Invention

The present invention relates to a printer vibration isolating apparatus for damping vibration of a printer and preventing the vibration from the printer from prevailing over other associated instruments during printing.

2. Description of the Prior Art

In use of a computer appliance representative of an office-automation machine, a printer operated by the host appliance is usually located in its vicinity. In this case, for example, a mount table having a structure for mounting the printer on the top portion of a main unit of a computer or a display unit is used for effective utilization of the space, i.e., the dead space above such a unit, or a table is used to place both the printer and the unit on a common plane thereof.

In operating a printer, especially a dot printer, reciprocating movement of a printing head causes lateral vibration. If the above-mentioned printer and the host appliance are located one above the other by means of the mount table, frames constituting the mount table laterally vibrate as if they were turned into springs, and particularly when the printer is mounted on the uppermost position of the mount table, it violently vibrates to a great extent. On the contrary, in case the printer and the host appliance are placed on the same plane of the table, the vibration of the printer also influences the host appliance, if not so badly as the above example. This matter is a problem to be solved.

SUMMARY OF THE INVENTION

As a result of our examination of this problem, there has been developed a printer vibration isolating apparatus comprising a left and right pair of printer mounting portions for holding the bottom of a printer and a left and right pair of vibration control swingable means for supporting the printer mounting portions swingably.

For such vibration control swingable means, it has been found desirable to employ a concave-surface base extending in parallel to a direction of movement of a printing head and rollers which operate rolling motion on the concave-surface base or swing mounts which are swingably operated in parallel to the direction of movement of the printing head.

The printer vibration isolating apparatus of such a structure can hold the printer without increasing the mounting height of the printer drastically. The vibration control swingable means, which are swingably operated in response to the lateral vibration of the printer, can dampen the lateral vibration, thereby restricting transmission of the vibration to the mount table. The vibration of the printer can be accordingly prevented from prevailing over the display unit or the like.

DETAILED DESCRIPTION OF THE PREFERRED EMBODIMENTS

The preferred embodiments according to the present invention will be hereinafter described in detail with reference to the attached drawings.

Figure 1:
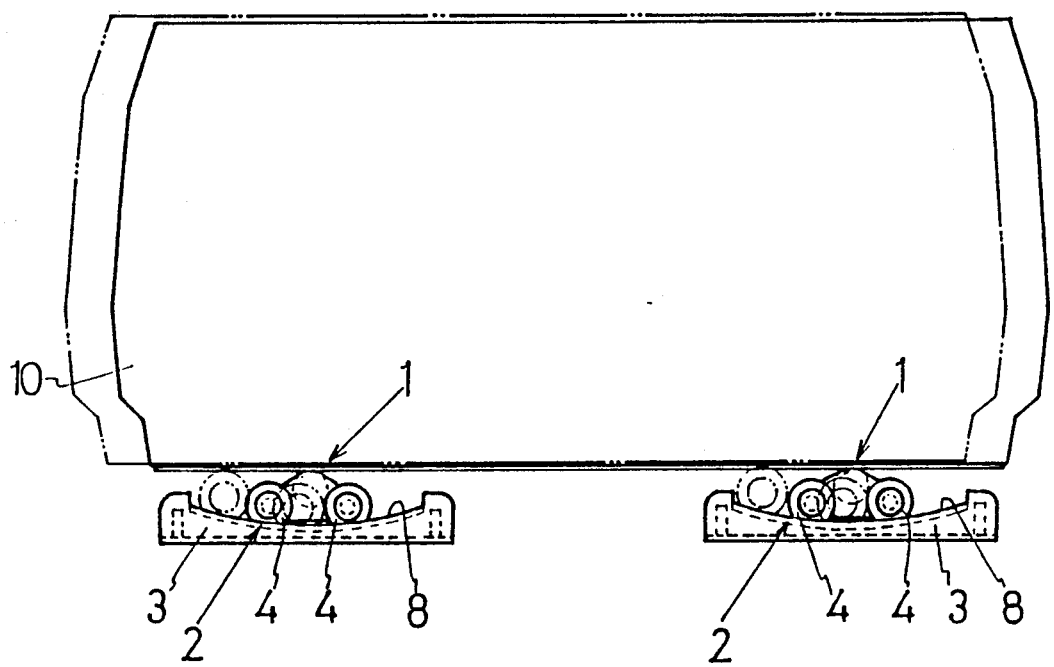
FIG. 1 is a front view showing a first embodiment of the present invention.
Figure 2:
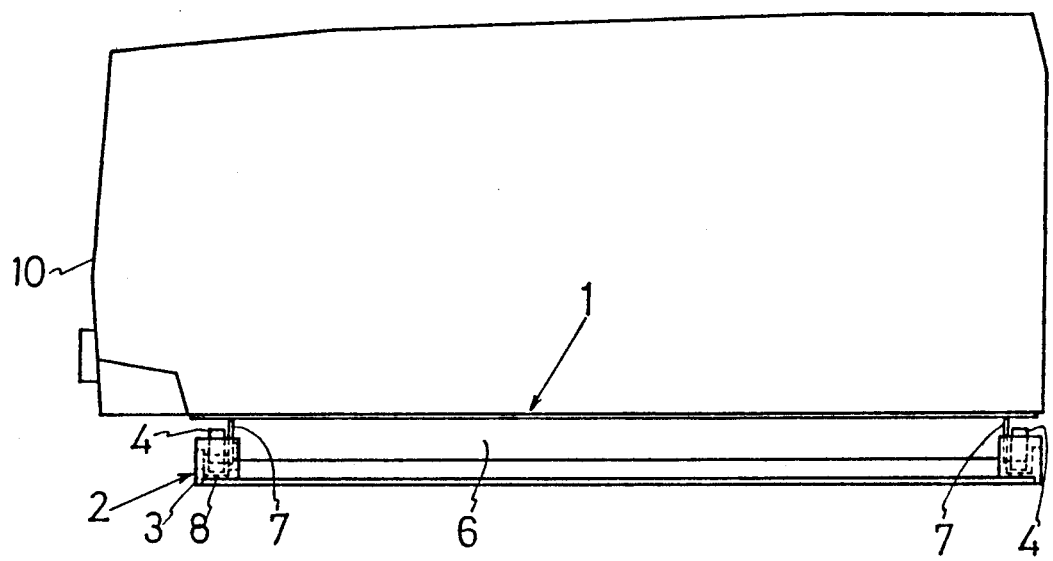
FIG. 2 is a side view of the same.
Figure 3:
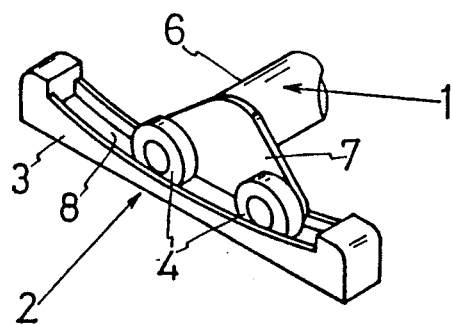
FIG. 3 is an enlarged perspective view of an essential part of the first embodiment.

FIGS. 1 to 3 show a first embodiment of the present invention. FIG. 1 is a front view showing a printer vibration isolating apparatus of the first embodiment, FIG. 2 is a side view of such a printer vibration isolating apparatus, and FIG. 3 is an enlarged perspective view showing an essential part of the same. As easily seen from FIG. 1, the printer vibration isolating apparatus of the illustrated embodiment comprises a left and right pair of devices having the same structure, on which a printer 10 is to be mounted in practical use. In this embodiment, a support rod 6 which is longer than the printer 10 supports the printer 10 and is a printer mounting portion 1. Opposite ends of the support rod 6 respectively fastened on the upper portions of triangular plates 7. A plurality of rollers 4 are provided on the left and right lower portions of each triangular plate 7, for serving as vibration control swingable means 2. These rollers 4 are placed on a concave-surface base 3 extending in parallel to a direction of movement of a printing head. The concave-surface base 3 is a block formed with a roller guide groove 8. The bearing surface of this roller guide groove 8 is arcuately concaved such that its intermediate portion occupies a level of the lowest portion of the groove, and that the bearing surface of the groove gradually rises in height toward either end thereof.

When the printer 10 is commenced to laterally vibrate, as illustrated with a chain double-dashed line in FIG. 1, the above-state structure allows the rollers 4 of the printer vibration isolating apparatus interposed between the printer 10 and a printer mount table or the like to operate rolling motion within the roller guide groove 8 of the concave-surface base 3, so as to absorb the lateral vibration of the printer 10 and protect the mount table from the fluctuation.

Figure 4:
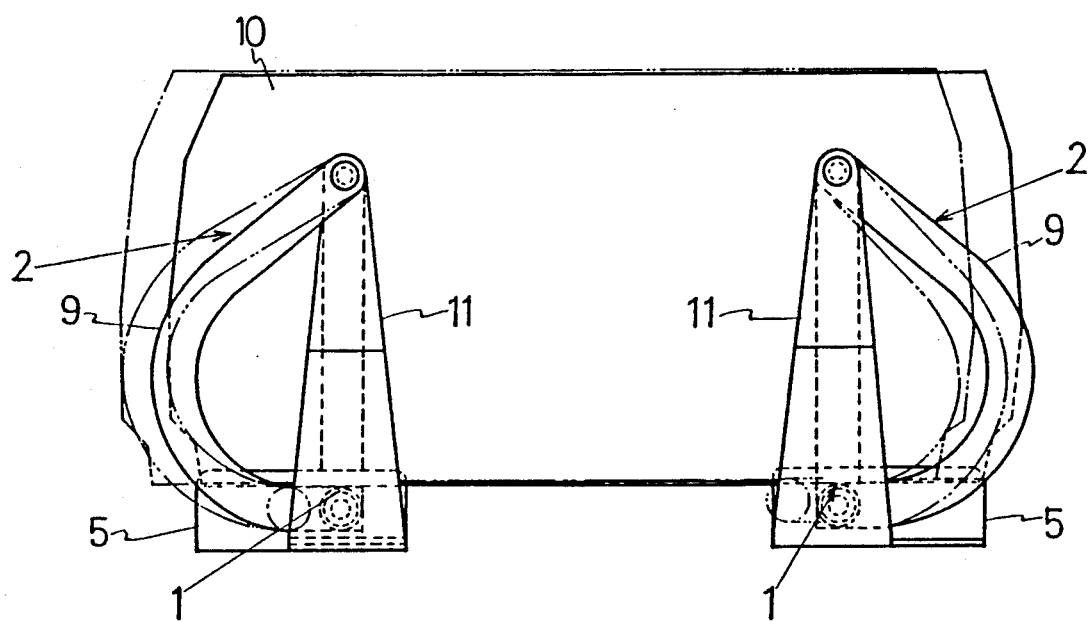
FIG. 4 is a front view showing a second embodiment of the present invention.
Figure 5:
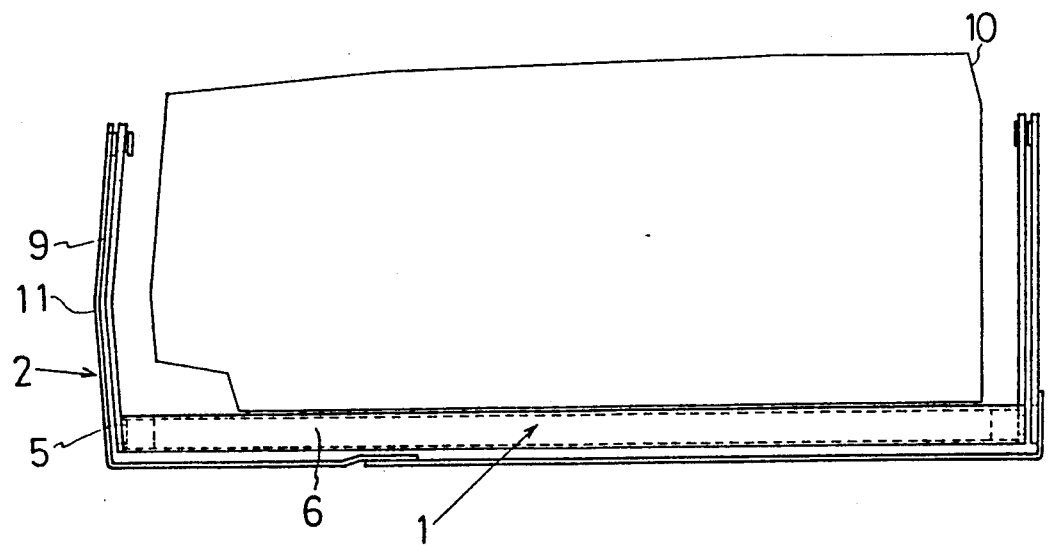
FIG. 5 a side view of the same.

FIGS. 4 and 5 show a second embodiment of the present invention. FIG. 4 is a front view showing a printer vibration isolating apparatus of the second embodiment, and FIG. 5 is a side view of the same. The vibration control swingable means 2 in this embodiment are swing mounts 5 which are swingably operated in parallel to the direction of moving the printing head. A left and right pair of these swing mounts 5 are symmetrically located opposite to each other. Each swing mount 5 includes the support rod 6 serving as the printer mounting portion 1 on which the printer 10 is mounted, and this support rod 6 is swingably connected to a column 11 of the main body of the mount by means of a hanging bent arm 9.

The printer vibration isolating apparatus according to the present invention is of the structure described heretofore so that, when the printer vibrates, the lateral vibration can be isolated from other associated instruments. Thus, the vibration can be prevented from causing such unfavorable influences as difficulty in observation of a display and operational errors of the associated instruments.

What is claimed is:

1. A printer vibration isolating apparatus for absorbing lateral vibration caused by reciprocal movement of a printing head of a printer comprising a left and right pair of vibration control swingable means for supporting the printer said pair of vibration control swingable means comprising a pair of concave-surface bases extending in a direction parallel to a direction of said reciprocal movement of said printing head of said printer, a pair of triangular plates arranged so as to have one upper apex and two lower apexes, a set of at least two rollers rolling on each said concave-surface base, the rollers of each said set of rollers being provided at the lower apexes of each said triangular plate and a support rod for supporting thereon said printer, said support rod being coupled between the upper apexes of said pair of triangular plates.

* * * * *